United States Patent
Gearing

[11] Patent Number: 5,709,723
[45] Date of Patent: Jan. 20, 1998

[54] METHOD FOR PRODUCING LARGE GLASS PREFORMS

[75] Inventor: Daniel R. Gearing, Rochester, N.Y.

[73] Assignee: Eastman Kodak Company, Rochester, N.Y.

[21] Appl. No.: 639,463

[22] Filed: Apr. 29, 1996

[51] Int. Cl.⁶ .................................................. C03B 11/16
[52] U.S. Cl. .................. 65/29.11; 65/29.17; 65/29.18; 65/29.19; 65/29.21; 65/66; 65/123; 65/127; 65/133
[58] Field of Search ................. 65/29.11, 29.17, 65/29.18, 29.19, 29.21, 66, 123, 127, 128, 130, 133

[56] References Cited

U.S. PATENT DOCUMENTS

| | | | |
|---|---|---|---|
| 1,619,729 | 3/1927 | Howard | 65/29.17 X |
| 2,871,000 | 1/1959 | Dowling | 259/4 |
| 3,266,881 | 8/1966 | Novack et al. | 65/130 |
| 3,271,126 | 9/1966 | Jenkins | 65/160 |
| 3,293,017 | 12/1966 | Jenkins | 65/72 |
| 3,573,017 | 3/1971 | Griem, Jr. | 65/2 |
| 3,846,107 | 11/1974 | Foster et al. | 65/164 |
| 3,860,407 | 1/1975 | Fertik | 65/161 |
| 3,888,647 | 6/1975 | Breeden et al. | 65/29 |
| 4,011,070 | 3/1977 | Hynd | 65/29 |
| 4,165,975 | 8/1979 | Kwiatkowski et al. | 65/29.17 |
| 4,205,973 | 6/1980 | Ryan | 65/29.17 X |
| 4,312,658 | 1/1982 | Mayer | 65/29 |
| 4,402,724 | 9/1983 | Weisenburger et al. | 65/128 |
| 4,549,895 | 10/1985 | Izumitani et al. | 65/29.21 |
| 4,557,744 | 12/1985 | Fenton et al. | 65/29 |
| 4,787,926 | 11/1988 | Varrasso | 65/2 |
| 4,842,085 | 6/1989 | Lang | 177/164 |
| 5,171,347 | 12/1992 | Monji et al. | 65/64 |
| 5,284,501 | 2/1994 | Monji et al. | 65/32.5 |
| 5,322,541 | 6/1994 | Shimizu et al. | 65/66 |
| 5,378,255 | 1/1995 | Ito | 65/64 |

FOREIGN PATENT DOCUMENTS

| | | |
|---|---|---|
| 27 11 811 | 9/1978 | Germany. |
| 313781 | 11/1971 | U.S.S.R. . |
| 324224 | 12/1971 | U.S.S.R. . |
| 442998 | 9/1974 | U.S.S.R. . |

*Primary Examiner*—Donald E. Czaja
*Assistant Examiner*—Sean Vincent
*Attorney, Agent, or Firm*—Svetlana Z. Short

[57] ABSTRACT

A method of making gob preforms for the optical quality lens molding comprising: i) ejecting a measured gob molten glass through an exit in a stem of the container of a supply of molten glass; ii) allowing the gob to settle under gravity from the exit to a catching tool while heating the gob and the catching tool; and iii) continuing to heat the gob and tool until the gob is round.

20 Claims, 3 Drawing Sheets

METHOD FOR PRODUCING LARGE GLASS PREFORMS

BACKGROUND OF THE INVENTION

1. Field of the Invention

This invention is related to the manufacture of high quality glass optical components such as glass lens elements, and more particularly applies to an apparatus and method for manufacturing large glass performs that are used in making such components.

2. Description of the Prior Art

Because molding glass lens elements is done by compression rather than injection (as is done in the molding of plastic lens elements), a metered amount of glass, called a gob, is required for the molding of glass preforms. There are two fundamental preform shapes required, which parallel the two types of lens elements. For negative power glass lens elements, plano-plano preforms (i.e., preforms having two relatively flat surfaces) usually suffice. These preforms can be fabricated in high volume relatively inexpensively by grinding and polishing. For positive power glass lens elements, a ball-like shaped preform is usually required. A key requirement in the molding of glass lens elements of various shapes and powers is that the molds must touch the softened glass first at the center, and then press out to the edges in order to avoid wrinkles and voids.

In U.S. Pat. No. 3,271,126 and U.S. Pat. No. 3,293,017, there is a described apparatus and methodology for fabricating small glass wafers by means of dripping molten glass from an orifice (and herein referred to as an exit) in single drops into a catching, pressing and cooling mechanism. Each of such individual drops forms a small preform of glass that can be used in lens molding. However, there are limitations to the size of the glass gob achievable by such method, and thus to the size of a glass lens element made from such a gob. The problems of viscosity, de-vitrification and fundamental physics, such as surface tension and gravity, all come into play when one attempts to extend this method to much larger glass gobs (i.e., gobs weighing approximately 0.5 grams or more).

For larger size glass gobs, the glass industry has long used a flow and shear method for producing blanks that may be ground and polished into lens elements. This latter method produces glass gobs with shear and tail fold-in marks. Shear marks are marks produced as a result of cutting off (i.e., shearing off) the glass to produce a given size preform. Tail fold-in marks are marks produced by the tail portion of the molten glass as it cures into the surface of the gob. In this latter method, the surface quality of the gobs is not paramount because the skin of the gob will be subsequently removed by grinding and polishing a lens element's surface. However, shear and tail fold-in marks on the glass gob can not be tolerated if lens elements are being produced by a molding method, i.e. without grinding and polishing.

Chill wrinkle is produced when hot glass meets the cold surface of a catching tool and the bottom layer of the glass quickly cools down, producing a wave-like or wrinkly pattern on the glass surface. Again, this pattern may be removed if a lens element is ground and polished. Also again, chill wrinkle can not be tolerated if the glass gob is used in molding high quality optical components such as the glass lens elements.

Homogeneity is one of the most important properties of optical glass. As one examines a thick piece of ordinary glass, one will often find a striae condition, that is, the layers of different densities show clearly in the form of internal irregularities, or streaks, that exhibit a higher or lower index of refraction than adjacent parts of the glass. Often, the striae are so small that they can not be detected until the glass is ground (into a lens element, for example) and polished. Because these striae affect the sharpness of an image formed by a lens system, glass with a striae condition can not be used in an optical instrument. A striae condition is produced when one part of molten glass cools faster than another part.

A preform made of non homogeneous glass (i.e., glass exhibiting striae conditions) can not be used in molding high quality components such as lens elements.

SUMMARY OF THE INVENTION

It is an object of the present invention to produce large (greater than 0.5 grams) glass preforms suitable for use in molding optical components of a larger size than was previously possible to make.

According to one feature of the present invention, a measured gob of molten glass is ejected through an exit in a stem of a container of molten glass and allowed to settle under gravity to a catching tool (i.e., a tool on which a measured quantity of molten glass is allowed to settle while assuming a ball-like shape) while heating the gob and the catching tool until the gob achieves its predetermined shape.

According to another feature of the present invention, the exit in the stem of the container is heated independently of the rest of the stem to provide for proper healing of the glass forming a tail, so that when the tail is formed, it folds into the gob's surface and heals into it without forming marks.

According to another feature of the present invention, a heat shield may be provided to reduce radiation loss from the surface of the gob in order to prevent the formation of cracks on the surface of the gob.

According to still another feature of the present invention, the method may include melting glass, controlling the amount of molten glass going into a working crucible and stirring the molten glass to achieve uniformity.

The present invention provides an improved apparatus and method of producing large glass preforms that are particularly suited for optical glass molding purposes. A large glass preform (greater than 0.5 grams) suitable for making optical quality lenses can now be made without shear marks and without chill wrinkle. This method and apparatus is especially useful in producing glass preforms 2 grams or larger.

BRIEF DESCRIPTION OF THE DRAWINGS

The foregoing and other objects, features and advantages of the invention will become more apparent from a reading of the following description in connection with the accompanying drawings in which.

DETAILED DESCRIPTION OF THE PREFERRED EMBODIMENT

It will now be shown how to fabricate a large glass preform with minimum chill wrinkle and no separation marks (as well as maintaining good internal quality) so that the resultant preform can be used in glass molding of larger size glass optical components.

An apparatus for making glass gobs preforms will first be generally described. Then, the specific embodiment that allows the fabrication of large preforms of optical quality will also be described. A large preform is defined as one weighing approximately 0.5 grams or more.

Figure 1:
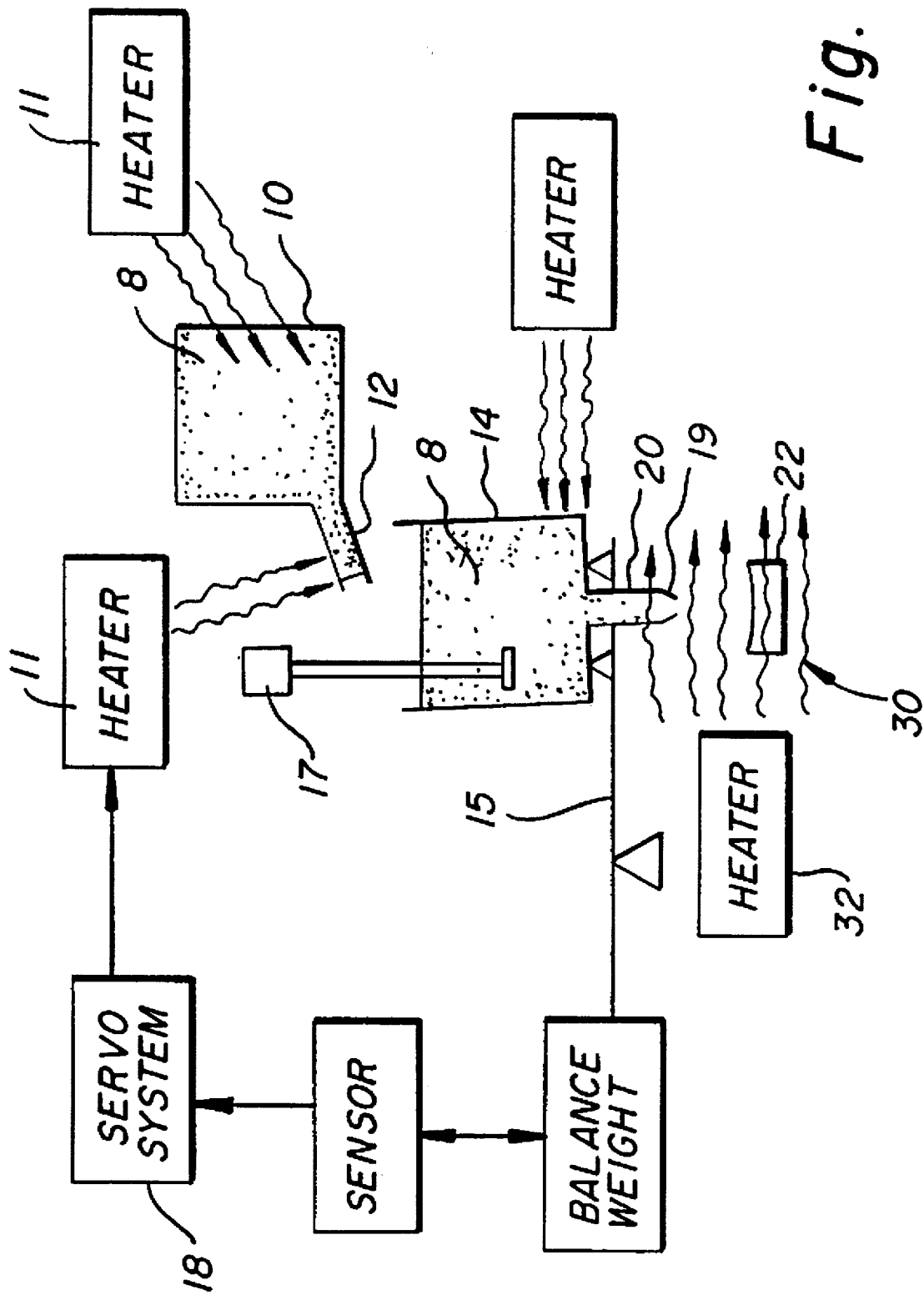
FIG. 1 is a diagrammatic view of an illustrative apparatus for making glass preforms in accordance with a preferred embodiment of the invention.

Referring to FIG. 1, a reservoir container such as a reservoir crucible 10 holds molten glass 8. A stem 12 at or near the bottom of the reservoir crucible 10 allows for feeding of molten glass into another container, such as a working crucible 14. The working crucible 14 has a stem 20 at or near its bottom that allows for feeding molten glass 8 (into a catching tool 22) through a tip 19 at the end of the stem. The stem and the tip are formed with a precise geometry in order to assist in defining a flow rate.

The working crucible 14 is supported on a levered system 15 to control its weight. As the weight of the working crucible 14 decreases, it receives more molten glass from the reservoir crucible 10. More specifically, a servo feedback system 18 is arranged so that, as the working crucible 14 is depleted of glass, a weighing system (such as a balance-beam weighing system) produces a signal that regulates heat radiated from a heater 11 and applied to the stem 12 of the reservoir crucible 10. This temperature regulation of the stem 12 acts as a metering valve and thus provides for glass replenishment to the working crucible 14. That is, in this embodiment, a servo feedback mechanism controls, by means of a balance-beam weighing system, the pressure head in the working crucible created by the volume of molten glass and, thus, controls the flow of glass. A strain-gage weighing system could also be used for this purpose. Other systems that can regulate glass flow may be used as well. In this manner, the pressure head for the working crucible 14 is held constant and the flow rate of glass through the stem 20 and the tip 19 of the working crucible 14 can be controlled to be uniform over an extended period of time. This ensures repeatability of (i.e., uniformity in) the gob size. For example, a flow rate of the order of one gram per second may be used to obtain a gob mass of about 1.5 grams.

A stirring mechanism 17 may also be used in the working crucible 14 to avoid bubbles.

To make small gobs, the thermal controls on the tip 19 of the stem 20 of the working crucible 14 and an exit (herein referred to as an opening or an orifice) of the stem 20 are set so that glass drips to form drops of an appropriate and repeatable size. To make a large gob, the tip geometry and the orifice size are adjusted or formed such that the molten glass flows rather than drips out of the opening at the tip 19 of the stem 20 and into the catching tool 22.

There are multiple catching tools 22 located on a rotary table 24 (FIG. 2) that are moved under the tip 19 opening. This rotary table 24 is indexed via a logic and control unit (LCU) at a turn rate consistent with the flow rate established for a given preform type (i.e., glass type and size). A suitable motorized drive (driven by a motor means M) is provided for driving the table. The individual catching tools are cammed up or raised up by a suitable lifting means into a heat zone 30 near the tip 19 for an appropriate dwell time to meter the glass amount while the working crucible stem valve 20 is activated by the application of heat from a heater such as a coil heater. The catching tool is then lowered by means 40 or cammed down sufficiently far to pull off a separating tail without benefit of shears while the tail is still in the heat zone 30 of the tip. This heat may be generated by an additional heater 32 such as the heated coiled wire shown in FIG. 2. The heat from the heat zone 30 keeps both the glass mass located on the catching tool and the glass tail hot. Therefore, the tail heals in the surface of the gob while the gob and the tail are both hot and produces only a minimum mark, or no mark at all on the surface of the glass when the glass gob is cooled. Thus, sheer marks and tail fold-in marks are both avoided and high surface quality is obtained.

As stated above, chill wrinkle is produced when hot glass meets a cold surface of the catching tool and the bottom layer of the glass quickly cools down producing a wave-like or a wrinkly pattern on the glass surface. To summarize, chill wrinkle is also avoided by heating and/or preheating the catching tool.

Preheating the catching tool in a pre-heat station 26 to a temperature above the ambient temperature (such as a temperature of 200° C. or higher) also helps to keep the glass from cooling down too quickly and, thus, helps to keep the glass temperature higher than the solidifying point for this particular glass and, thus, the tail heals in the surface of the gob without producing tail fold-in mark.

Preheating the catching tool is also beneficial because, as the tail falls in, a striae condition (i.e., the problem with homogeneity described above) is not obtained. As stated above, homogeneity is one of the most important properties of optical glass. As one examines a thick piece of ordinary glass, one will find a striae condition, i.e., a condition wherein the layers of different densities show clearly in the form of internal irregularities or streaks that exhibit a higher or lower index of refraction than the other part of the glass. Often the striae are so small that they can not be detected until the glass is ground (as a lens, for example) and polished. Because these striae affect the sharpness of an image formed by the lens, glass with a striae condition can not be used in an optical instrument. Therefore, it is preferred that a pre-heat station 26 be provided before the tip station (and herein also referred to as a drop station) 28 to elevate the temperature of the catching tool in advance of receiving glass so that chill wrinkle will, at best, not be produced or, at worst, be minimized, and so that a striae condition is not obtained. (A certain amount of chill wrinkle can usually be tolerated in the subsequent pressing process).

Figure 3:
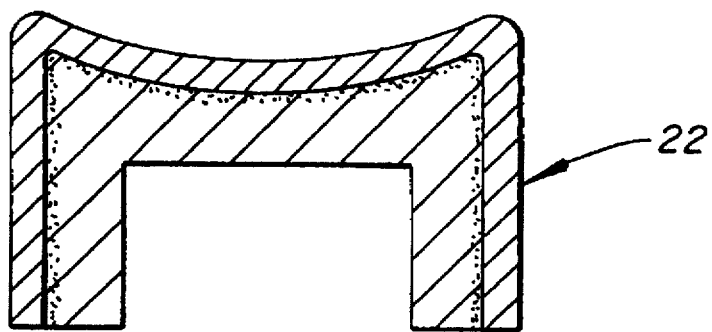
FIG. 3 is a schematic of a vertical cross-section of the catching tool of FIG. 2.

The heat in the catching tool 22 is maintained at the tip 19 of a drop station 28 by an additional heater or a heating station 32 which overlaps the tool and the tip. To be effective, the catching tool's temperature is preferably elevated substantially above the ambient temperature. It is preferred that this temperature be at least to 200° C. and it is especially preferable for the temperature to be much higher, such as from about 400° to about 1200° C. A graphite catching tool of the form shown in FIG. 3 is preferred because graphite does not interact chemically with glass. However, since graphite burns at 500° C., it is preferred that the graphite catching tool itself be heated to about 400° C. or less. The thickness of graphite is of the order of several millimeters. This is done so that the catching tool does not cool and as a result does not pull the heat out of the glass. Materials other than graphite can be also used to manufacture catching tools, as long as they can withstand high temperatures. For example, catching tools manufactured out of ceramics such as alumina and silica can be used. The heating temperature for these tools can reach and exceed 1000° C.

More specifically, the following procedure and apparatus is used to produce large gob preforms according to a preferred embodiment of the present invention.

1. A quantity of molten glass is placed in a reservoir crucible 10. The reservoir crucible 10 is heated by a heater 11, such as heating coils, to keep the glass at the appropriate temperature. This heater may extend to a reservoir stem, or a separate heater may be used to heat a reservoir stem. The temperature of the glass and the size of the opening of the reservoir stem will define the flow of molten glass out of the reservoir crucible. At relatively higher temperatures, the glass flows faster and at relatively lower temperatures the glass flows slower. As the temperature of the glass increases, the viscosity of the glass decreases making it easier for the glass to flow through a given size opening of the reservoir stem 12. Thus, by controlling the temperature of the molten glass, one can control the rate of flow of the glass out of the reservoir crucible as required.

2. The glass flows out of the reservoir crucible 10 through the reservoir stem 12 into the working crucible 14. The working crucible 14 is also heated to maintain the glass viscosity at a predetermined value. The working crucible has a working crucible stem 20 with a tip 19 including an opening through which the proper amount of molten glass flows out. The control of the temperature of the stem 20 provides a valve action that controls the glass flow. The stem 20 of the working crucible is maintained at the proper temperature to provide for the desired flow rate of glass and is cooled off to stop the flow of glass when enough glass mass is obtained for a given size gob. It is preferred that there be provided a separate heating means for the stem 20 and for the tip 19.

The tip temperature control is beneficial in the production of large gob preforms because it helps to heat the remainder of glass that forms the tail thus aiding in healing the tail, i.e., merging it into the gob's surface. In a specific embodiment (FIGS. 1 and 2), induction heaters (heating coils) are used to control the temperatures of the stems 12 and 20 and the temperature of the tip 19. The induction heater is controlled by a synchronized timing sequence adjusted for the individual gob type (size and glass type) being produced. That is, the power to the heating coils is turned off and on in synchronization with the movement of the catching tools and the movement of the rotary table, providing almost instantaneous heat to the tip 19 and/or the stems 14 and 20. Cool-off of the stems or tips is achieved by stopping the active heating.

3. As stated above, the feed-back mechanism controls the pressure head in the working crucible. The amount of glass in the working crucible is maintained, and when it drops below the desired level, more molten glass is provided from the reserve crucible 10. This is accomplished by providing heat from heater 11 to the reservoir crucible stem 12 and re-initiating or increasing the flow of glass out of the reservoir crucible 10. As the pressure in the working crucible 14 is maintained at a constant rate, the flow of glass through the stem 20 of the working crucible 14 is also maintained at a constant rate. This ensures the repeatability of the gob size.

Figure 2:
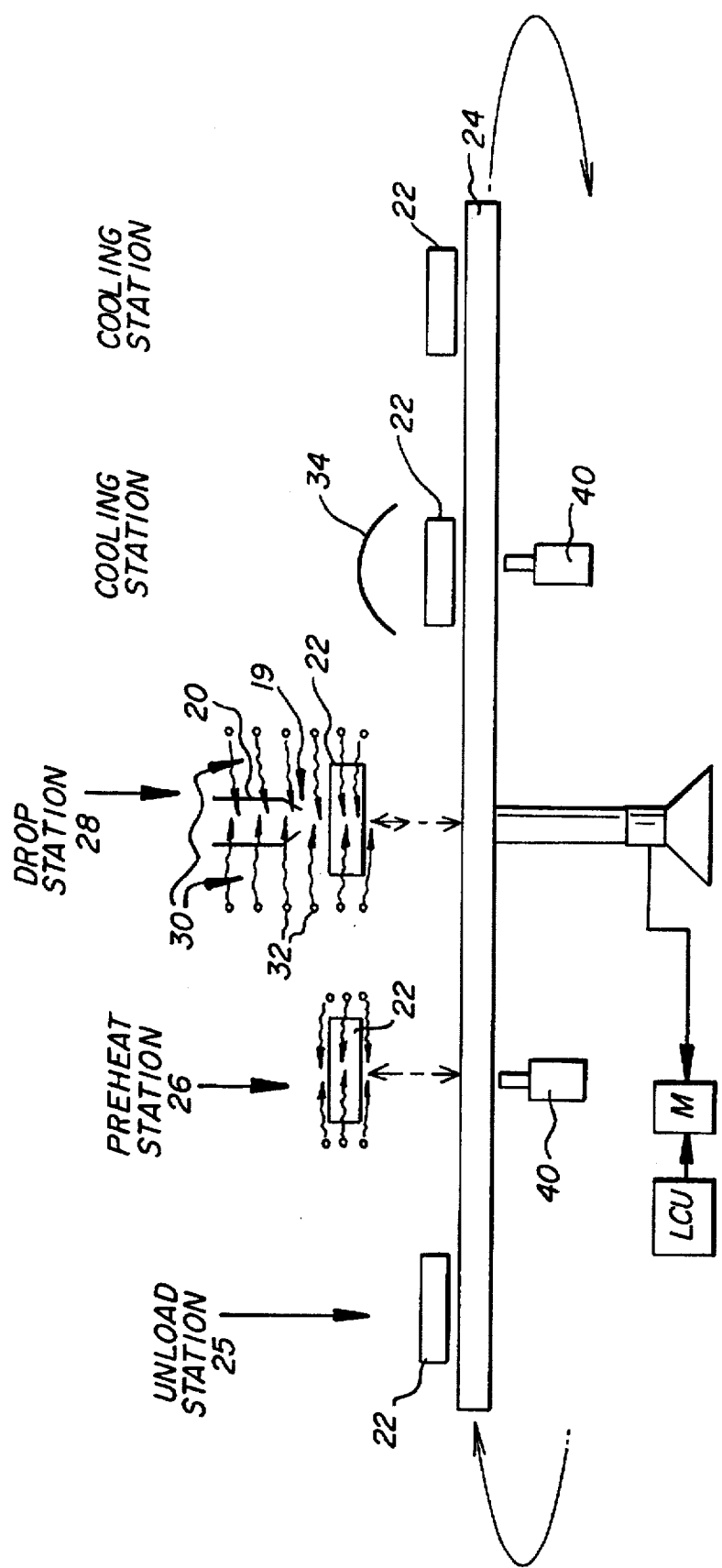
FIG. 2 is a diagrammatic view of a rotary table including a catching tool used in the apparatus of FIG. 1.

4. A plurality of catching tools 22 are rotated on a rotary table (FIG. 2). If the catching surface of a catching tool is spherical, the surface of the gob lying on the catching tool (i.e., bottom portion of the gob) will also be spherical. The surface tension of the gob will make the upper surface of the gob (i.e., the portion contacting air) assume a spherical form. Thus, the gob, when finally made, will assume the shape of a sphere or a ball. The rotary table rotates in a horizontal plane via the use of a transport means. As a catching tool approaches the tip of the working crucible stem, it is moved up by suitable means (or cammed up) into a pre-heat station 26. For example, a heated coil of wire may be utilized to heat a catching tool to a required temperature. A heated catching tool 22 is then cammed down and moved under a drop station 28 and more precisely under the stem of the working crucible. It is again brought up (cammed up) into a heating station 32 which is located under the stem of the working crucible. This heating station 32 is required to heat not only the catching tool, but also the area above the catching tool, i.e., the area containing the molten glass flowing from the working reservoir stem. As the desired volume of glass reaches the catching station, the catching tool slowly moves down (cams down) by sufficient distance and the flow of glass from the stem is deactivated. This action forms a "tail" which then detaches from the stem of the working crucible and folds into the gob mass laying on the catching tool. Although a little bit of tear-off occurs during this "camming down" step, the tail heals because it is located in the heating zone. That is, the application of this heat will keep the tail of the glass from cooling off and solidifying before it folds into the glass. It also keeps the glass surface temperature above the solidifying point so that as the tail falls in, we do not get the striae condition. The catching tool 22 is then cammed down further to the table level and is subsequently moved to a cooling station. Thus, a suitable means for camming up or down or for up/down movement of the catching tools needs to be provided. In a specific preferred embodiment (FIG. 2), a computer controlled stepping motor is used to power a cam and a follower device, not shown, to provide a camming action. However, other means for moving the catching tools up and down may also be used.

5. In order to provide a plano-plano preform, a flat surfaced catching tool and/or an additional pressing station may also be used. Such pressing station would contain a pressing head which is activated to flatten a large gob and to produce a plano-plano preform.

6. In cases of very large glass gob preform manufacturing, it is advantageous to minimize the sudden heat loss from the surface of the portion of the glass gob that is exposed to air. This prevents the glass gob surface from cracking. The larger the gob, the greater the likelihood of its cracking. This is because the heat loss is proportional to $T^4$, where T is the temperature of the glass. Glass, being a thermally insulating material, is subject to surface cracks because its surface cools faster than the inside, causing stress that results in cracks. Thus, to prevent the surface from cracking, the loss of heat from the glass-air interface should be minimized (i.e., the cooling rate of the gob should be reduced). For example, a shield, such as a reflective surface 34, may be placed above the catching tool containing the hot gob preform. This reflective surface will direct the heat radiated from the glass back onto the glass, preventing it from cooling down too quickly. According to the preferred embodiment, the glass gobs are cooled down to room temperature (i.e., ambient temperature) without the use of any additional cooling means and can be either stored or used in molding immediately. The total cooling time required for a given size gob and a given glass type will vary. It is preferred that at least 3 minutes are allowed for the glass gob to cool down to the ambient temperature. It is especially preferred that the cooling down time for a glass gob be about 5–10 minutes.

Figure 4:
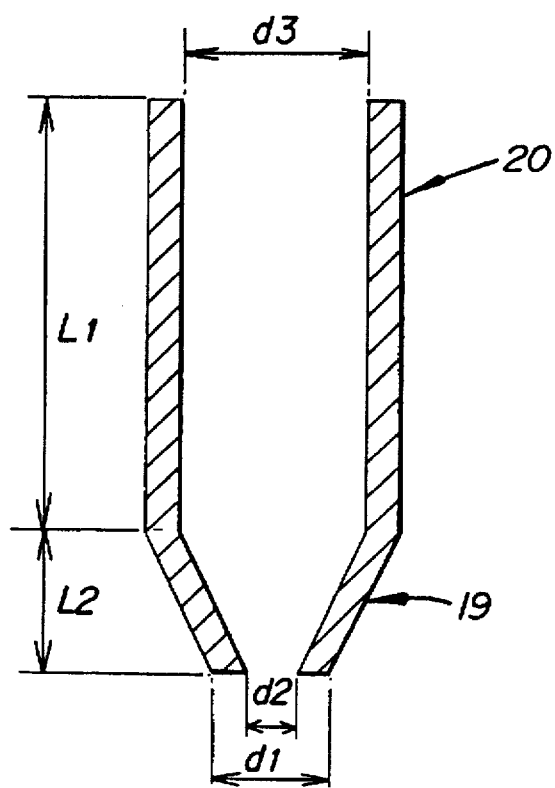
FIG. 4 is a schematic of a vertical cross-section of the working crucible stem used in the apparatus of FIG. 1.

In a specific preferred embodiment (FIG. 4), the working crucible tip that is used to define a gob of LaF-71 glass of approximately 2 grams is made of a platinum/gold alloy (95% Pt/5% Au). The length $L_1$, of the stem 20 is about 3 inch and the length $L_2$ of the tapered tip 19 is about 0.5 inches. The inner diameter $d_3$ of the stem is about 0.3 inches. An exit (i.e., orifice) of the stem tip is formed as a taper and has an inner orifice diameter $d_2$ that is 0.035 inches. The outside diameter $d_1$ of the exit is 0.374 inches. The bottom section of the tip 19 is flat. These parameters are important and are chosen as a function of the glass type being used and the size of the gob desired.

The temperatures of the reservoir crucible and working crucible are to be held constant (in the case of LaF-71 glass, at approximately 1200° C.). The working crucible has a stirrer working at 100 rpm to control striae. The tip temperature would be run at a value 100–200 centigrade degrees cooler depending on the ambient temperature and the tendency of the glass to devitrify. This temperature, in combination with the height of the glass and the tip opening size in the working crucible, control the flow rate of the glass. The flow rate and the time required for the glass to flow through the stem of the working crucible determines the gob size. The stem of the working crucible is the small tube connection between the bottom of the crucible and the tip. When heated by an RF induction heater, it provides the valving action for glass flow control. The catching tool is cammed downward after the desired size of the glass gob is achieved in order to sever the tail of glass. Controlling the heat at the separation zone will cause the tail to heal into the main bulk of the gob without leaving tail fold-in marks. By controlling the pre-heat of the catching tool (approximately 400° C.) the chill wrinkle is minimized. All of these considerations combine to produce a directly usable preform with adequate internal and surface quality for glass lens molding of high quality.

The heating of crucibles, stems and tools can be accomplished by RF (radio frequency) induction heating, resistive heating (such as AC current, for example) or a combination of these methods. The heating of the crucibles is done at a constant rate and over long periods of time. A quick application of heat is not necessary for the heating of the crucible. However, it is necessary for the heating of the stems and the tip.

It is preferred that the heating sequences and a rotary table action be computer controlled.

The heat sensing of the catching tools and/or of the crucible stems and tips may be done by a variety of methods known in the art of temperature control, including, but not limited to the use of thermocouples or radiation thermometry. In a specific preferred embodiment a radiation thermometer which is an IR (infrared) imaging device of the "Ircon" type (manufactured by Square D, Co.) is used. An additional pressing station could be added to the sequence on the rotary table where a pressing head is activated to compress a large gob to produce a pseudo-plano-plano preform.

For example, large preforms weighing 10 or more grams, of several optically useful glasses (both crown and flint) can be made by this method. They can then be successfully molded into high quality glass lens elements suitable for use in consumer cameras, printers, scanners, etc.

The invention has been described in detail with particular reference to a preferred embodiment thereof, but it will be understood that variations and modifications can be effected within the spirit and scope of the invention.

What is claimed is:

1. A method of making a glass preform of predetermined shape comprising:

i) holding a supply of molten glass in a container having an exit through a stem;
   ii) ejecting a measured gob from the supply of molten glass in the container through the exit in the stem;
   iii) moving up a catching tool towards the stem to receive a quantity of molten glass in a heating station;
   iv) allowing the gob to settle under gravity from the exit to said catching tool while heating the gob and the catching tool; and
   v) moving down said catching tool sufficiently so as to separate the stem from a tail on said gob;
   vi) continuing to heat at least said tail in said heating station; and
   vii) continuing to heat the gob and the catching tool until the gob has said predetermined shape.

2. A method according to claim 1, wherein both said exit and said stem are heated and said exit is heated independently from said container to keep glass tail hot and to provide proper healing of the glass forming said tail on the surface of said gob.

3. A method according to claim 1 further providing a shield to reduce radiation loss from the gob.

4. A method of making glass preforms comprising:

melting glass;
   controlling a supply of molten glass into a working crucible;
   stirring the molten glass to achieve uniformity;
   providing at least one catching tool for receiving a predetermined amount of the molten glass from said working crucible;
   camming up said catching tool to receive a quantity of molten glass in heating station;
   camming down said catching tool sufficiently while still being in a heating station to pull off a separating tail and to heal the said tail; and
   controlling the temperature of said catching tool at a required temperature which is substantially elevated above ambient temperature to control quality of the glass preform; and
   forming the glass preform.

5. A method according to claim 4 further including heating said working crucible and a crucible stem through which said predetermined mount of molten glass is received by said catching tool from said working crucible.

6. The method as described in claim 5 where heating said working crucible, said stem and said catching tool is accomplished by RF induction heating.

7. The method as described in claim 5 where heating said working crucible, said stem and said tool is accomplished by resistive heating.

8. A method as described in claim 7, wherein said resistive heating is AC resistive heating.

9. The method as described in claim 5 where heating said working crucible, said stem and said tool is accomplished by a combination of RF induction heating and resistive heating.

10. A method as described in claim 9, wherein said resistive heating is AC resistive heating.

11. The method as described in claim 4 where the step of controlling a supply of molten glass into a working crucible is achieved by a servo feedback mechanism.

12. A method according to claim 11, wherein said servo feedback mechanism includes a balance-beam weighing system.

13. The method as described in claim 11, wherein said servo feedback mechanism includes a strain-gage weighing system.

14. The method as described in claim 4 further including a heating sequence and a rotary table action which are computer controlled.

15. The method as described in claim 4 further including heat sensing which is done by means of radiation thermometry.

16. The method as described in claim 4 further including heat sensing which is done by means of thermocouples.

17. A method as described in claim 4 including:
i) supplying a rotary table to support said catching tools; and
ii) supplying a pressing station and activating a pressing head which is activated to compress a glass preform and to produce a plano-plano preform.

18. A method according to claim 4 further including the steps of
cooling said glass preform to an ambient temperature.

19. A method of making glass preforms that includes:
melting glass;
placing the molten glass into a working crucible and stirring the molten glass for uniformity;
providing an orifice from said working crucible for the predetermined amount of outflow of the molten glass;
placing successive catching tools under said orifice and moving them up, towards said orifice, to receive a predetermined amount of the molten glass;
lowering said tools after the predetermined amount of the molten glass is received to pull off said tail while said tail, is being heated;
heating said catching tools to a desired temperature which is substantially elevated above the ambient temperature and controlling the temperature of said catching tools; and
forming glass preforms on said catching tools;
metering the size of glass preforms on a repetitive basis by controlling the glass pressure in said working crucible with a servo feedback mechanism.

20. A method according to claim 19 wherein controlling said temperature of said catching tools includes heating said catching tools to said desired temperature prior to and while they are placed under said orifice.

* * * * *

UNITED STATES PATENT AND TRADEMARK OFFICE
CERTIFICATE OF CORRECTION

PATENT NO. : 5,709,723
DATED : 20 January 1998
INVENTOR(S) : Daniel R. Gearing

It is certified that error appears in the above-identified patent and that said Letters Patent is hereby corrected as shown below:

Cover Page, insert --[60]Provisional Application No. 60/002,574, filed 21 August 1995 --
Column 1, Line 3, -- CROSS REFERENCE TO RELATED APPLICATION; Reference
insert is made to and priority claimed from U.S. Provisional Application Serial No. 60/002,574, filed 21 August 1995, entitled METHOD AND APPARATUS FOR PRODUCING LARGE GLASS PREFORMS --

Signed and Sealed this

Twenty-seventh Day of October, 1998

Attest:

BRUCE LEHMAN

*Attesting Officer*     *Commissioner of Patents and Trademarks*